United States Patent
Peeters

(10) Patent No.: US 8,381,057 B2
(45) Date of Patent: Feb. 19, 2013

(54) SEAMLESS CHANGE OF RETRANSMISSION AND RESCHEDULING QUEUES IN A COMMUNICATION SYSTEM

(75) Inventor: Miguel Peeters, Woluwe St. Lambert (BE)

(73) Assignee: Broadcom Corporation, Irvine, CA (US)

( * ) Notice: Subject to any disclaimer, the term of this patent is extended or adjusted under 35 U.S.C. 154(b) by 908 days.

(21) Appl. No.: 12/385,546

(22) Filed: Apr. 10, 2009

(65) Prior Publication Data

US 2010/0031108 A1    Feb. 4, 2010

Related U.S. Application Data

(60) Provisional application No. 61/129,979, filed on Aug. 4, 2008.

(51) Int. Cl.
  *H04L 1/18*  (2006.01)
  *G08C 25/02* (2006.01)

(52) U.S. Cl. ....................................... 714/748

(58) Field of Classification Search ........... 714/748–751
  See application file for complete search history.

(56) References Cited

U.S. PATENT DOCUMENTS

| | | |
|---|---|---|
| 5,434,847 A | 7/1995 | Kou |
| 5,959,994 A | 9/1999 | Boggs et al. |
| 5,970,253 A | 10/1999 | Purdham |
| 6,373,842 B1 | 4/2002 | Coverdale et al. |
| 6,694,470 B1 | 2/2004 | Palm |
| 7,058,027 B1 | 6/2006 | Alessi et al. |
| 7,120,429 B2 | 10/2006 | Minear et al. |
| 7,197,317 B2 | 3/2007 | Parkvall et al. |
| 7,234,086 B1 | 6/2007 | de Koos et al. |
| 7,330,432 B1 | 2/2008 | Revsin et al. |
| 7,359,359 B2 | 4/2008 | Parkvall et al. |
| 7,382,732 B2 | 6/2008 | Peisa et al. |
| 7,403,541 B2 | 7/2008 | Yi et al. |
| 7,561,523 B1 | 7/2009 | Revsin et al. |
| 7,630,862 B2 * | 12/2009 | Glas et al. ..................... 702/186 |
| 7,657,815 B2 | 2/2010 | Seidel et al. |
| 7,970,733 B2 | 6/2011 | Christiaens et al. |
| 2002/0080727 A1 * | 6/2002 | Kim et al. ..................... 370/252 |
| 2002/0167949 A1 | 11/2002 | Bremer et al. |
| 2003/0076826 A1 | 4/2003 | Blasiak et al. |

(Continued)

FOREIGN PATENT DOCUMENTS

| | | |
|---|---|---|
| CN | 1318245 A | 10/2001 |
| KR | 10-2002-0000650 | 1/2002 |

OTHER PUBLICATIONS

English-language Abstract of Chinese document 1318245A (1 page).

(Continued)

*Primary Examiner* — Guy Lamarre
(74) *Attorney, Agent, or Firm* — Sterne, Kessler, Goldstein & Fox P.L.L.C.

(57) ABSTRACT

A system and method for changing retransmission and rescheduling queues to support retransmission in a communications system is presented. A method for changing queue size values includes, for an increase in data rate, determining a new retransmission queue size value for a retransmission queue at the transmitting device and a new rescheduling queue size value for a rescheduling queue at the receiving device such that an amount of time for a DTU to enter and exit the retransmission queue is greater than a roundtrip delay. For a decrease in data rate, the method includes determining the new retransmission queue size value and the new rescheduling queue size value such that an amount of time for a DTU to enter and exit the retransmission queue is less than a maximum delay. Systems and methods for changing the retransmission and rescheduling queue sizes are also presented.

33 Claims, 14 Drawing Sheets

U.S. PATENT DOCUMENTS

| | | | |
|---|---|---|---|
| 2003/0208772 A1 | 11/2003 | Milbrandt | |
| 2004/0202181 A1* | 10/2004 | Mitchell | 370/395.4 |
| 2005/0025090 A1* | 2/2005 | Klein et al. | 370/328 |
| 2005/0094667 A1 | 5/2005 | Dahlman et al. | |
| 2005/0135412 A1 | 6/2005 | Fan | |
| 2005/0286566 A1 | 12/2005 | Tong et al. | |
| 2006/0029101 A1 | 2/2006 | Williams | |
| 2006/0203760 A1* | 9/2006 | Fukui et al. | 370/328 |
| 2006/0215689 A1 | 9/2006 | Liu et al. | |
| 2007/0071177 A1 | 3/2007 | Macdonald et al. | |
| 2007/0217491 A1 | 9/2007 | Tzannes | |
| 2008/0062872 A1 | 3/2008 | Christiaens et al. | |
| 2008/0063007 A1 | 3/2008 | Christiaens et al. | |
| 2008/0228936 A1* | 9/2008 | Schmid et al. | 709/232 |
| 2009/0138775 A1 | 5/2009 | Christiaens et al. | |
| 2011/0314350 A1 | 12/2011 | Christiaens et al. | |

OTHER PUBLICATIONS

Office Action mailed on Dec. 1, 2010 for U.S. Appl. No. 11/853,532, filed Sep. 11, 2007 (32 pages).

Office Action mailed on Oct. 11, 2011, in U.S. Appl. No. 11/853,532, filed Sep. 11, 2007 (42 pages).

Office Action mailed on Jul. 6, 2010, in U.S. Appl. No. 11/853,532, filed Sep. 11, 2007 (28 pages).

Office Action mailed on Jan. 6, 2010, in U.S. Appl. No. 11/853,532, filed Sep. 11, 2007 (21 pages).

Office Action mailed on Jul. 9, 2009, in U.S. Appl. No. 11/853,532, filed Sep. 11, 2007 (24 pages).

Office Action mailed on Nov. 3, 2011, in U.S. Appl. No. 13/168,468, filed Jun. 24, 2011 (8 pages).

Stephen B. Wicker, "High-Reliability Data Transfer Over the Land Mobile Radio Channel Using Interleaved Hybrid-ARQ Error Control," IEEE Transactions on Vehicular Technology, vol. 39, No. 1, Feb. 1990, pp. 48-55.

Isaac Sofair, "Probability of Miscorrection for Reed-Solomon Codes," Proceedings, International Conference on Information Technology: Coding and Computing, 2000, pp. 398-401.

G.gen: A Hybrid PCTCM-ARQ Error Correction Scheme, ITU Telecommunication Standardization Sector, Temporary Document HC-52, Study Group 15, Canada, 2000, pp. 1-6.

English-language Abstract of KR 20020000650, published Jan. 5, 2002, 1 page, printed from http://v3.espacenet.com/publicationDetails/biblio?adjacent=true&KC=A&date=20020105 . . . .

* cited by examiner

SEAMLESS CHANGE OF RETRANSMISSION AND RESCHEDULING QUEUES IN A COMMUNICATION SYSTEM

CROSS-REFERENCED TO RELATED APPLICATIONS

This application claims the benefit of U.S. Provisional Patent Application No. 61/129,979, filed Aug. 4, 2008, which is incorporated herein by reference in its entirety.

BACKGROUND

1. Field of the Invention

The present invention generally relates to retransmission and rescheduling queues in a communications system, including a Digital Subscriber Line (DSL) system.

2. Background Art

Retransmission schemes in communication systems (e.g., DSL systems and other wired and wireless communication systems) are implemented to ensure that data safely arrives at its destination. In simplified terms, an exemplary retransmission scheme executes as follows. A transmitting device sends data (e.g., in the form of a data transmission unit (DTU), a data packet, etc.) to a receiving device. The receiving device checks the received data for errors. If the receiving device detects one or more errors, the receiving device sends a request to the transmitting device to retransmit that data. If the receiving device does not detect any errors, the receiving device can send an acknowledgement to the transmitting device that the data was successfully received. If the transmitting device does not receive a request for retransmission or an acknowledgement from the receiving device, the transmitting device can retransmit the data due to the uncertainty of safe receipt.

In order for a retransmission scheme such as the one described above to work, a retransmission queue can be used at the transmitting device and a rescheduling queue can be used at the receiving device. When a data unit (e.g., a DTU) is sent from the transmitting device to a receiving device, a copy of the data unit is pushed into the retransmission queue to be temporarily saved in case retransmission of that data unit becomes necessary. The retransmission queue must therefore be sized such that the data unit copy does not leave the retransmission queue prior to the transmitting device receiving an acknowledgement of safe receipt or a request for retransmission from the receiving device (i.e., a roundtrip duration). A rescheduling queue is used to reorder received data units into a correct order prior to being provided for use by the receiving device. Similar to the retransmission queue, the rescheduling queue must be sized such that a retransmission of the data unit can be received by the receiving device prior to the original (perhaps error-containing) data unit being output by the rescheduling queue for use by the receiving device.

It is often necessary for the transmission data rate to be changed. For example, if conditions on the line between the transmitting device and the receiving device change (e.g., worsen or improve), the transmitting device may receive a request to change the data rate accordingly. However, the range of the transmission data rate variation is limited by the roundtrip duration, a maximum delay, and/or impulse noise protection. As described earlier, the roundtrip duration is the delay between when a data unit is first transmitted (and a copy is pushed into the retransmission queue) and when an acknowledgment is received from the receiving device. The maximum delay is the delay between when a data unit is first transmitted (and a copy is pushed into the retransmission queue) and when the data unit is provided to the receiving device by the rescheduling queue. Impulse noise correction involves a maximum duration of continuous corrections that can occur with retransmissions. Any or all three of these durations (roundtrip duration, maximum delay, and impulse noise protection) can limit the range variation for the transmission data rate and therefore must be tightly controlled.

Therefore, systems and methods are needed that allow transmission data rate changes while avoiding violation of roundtrip and maximum delays and continuing to guarantee impulse noise protection.

BRIEF SUMMARY

A system and method for changing retransmission and rescheduling queues to support retransmission in a communications system is presented. In an embodiment, a method for changing queue size values includes communicating, between a receiving device and a transmitting device, a request to change a data rate for transmission of data transmission units (DTUs) of a fixed size (e.g., in bits). The method further includes, for an increase in data rate, determining a new retransmission queue size value for a retransmission queue at the transmitting device and a new rescheduling queue size value for a rescheduling queue at the receiving device such that an amount of time for a DTU to enter and exit the retransmission queue is greater than a roundtrip delay. The roundtrip delay is an amount of time between when the DTU enters the retransmission queue and when an acknowledgement is received from the receiving device regarding transmission of a corresponding copy of the DTU. In an embodiment, for a decrease in data rate, the method includes determining the new retransmission queue size value and the new rescheduling queue size value such that an amount of time for a DTU to enter and exit the retransmission queue is less than a maximum delay. The maximum delay is an amount of time between when a DTU enters the retransmission queue and when a corresponding copy of the DTU exits the rescheduling queue.

In an embodiment, a method for changing the size of the retransmission queue upon an increase in data rate includes adding a determined number of placeholder DTU spaces at the end of the retransmission queue, where the determined number is equal to a change in the retransmission queue size value divided by the fixed size of a DTU. The change in the retransmission queue size value is equal to a new retransmission queue size value minus a current retransmission queue size value. The method further includes transmitting new DTUs in an amount equal to the determined number while pushing a copy of each of the new DTUs into the retransmission queue such that the placeholder DTU spaces are pushed out of the retransmission queue.

In an embodiment, a method for changing the size of the retransmission queue upon a decrease in data rate includes, when retransmission is not needed, generating a placeholder DTU that is a valid DTU; transmitting the placeholder DTU; pushing a copy of the placeholder DTU into the retransmission queue; and decreasing a current rescheduling queue size value (as seen by the transmitting device) by one DTU. The method further includes checking a DTU at the end of the retransmission queue and responding as needed. The checking of a DTU at the end of the retransmission queue, and the necessary response, is repeated until a current retransmission queue size value equals a new retransmission queue size value and a current rescheduling queue size value equals a new rescheduling queue size value.

In an embodiment, a method for changing the size of the rescheduling queue upon an increase in data rate includes adding a determined number of DTU placeholder spaces to the rescheduling queue while postponing DTU release from the rescheduling queue for an amount of time that it would take to release DTUs in an amount equal to the determined number. In this embodiment, the determined number is equal to a new rescheduling queue size value minus a current rescheduling queue size value, where units of queue size are DTUs.

In an embodiment, a method for changing the size of the rescheduling queue upon a decrease in data rate includes changing the rescheduling queue size to a size equal to a new rescheduling queue size value after allowing all DTUs currently in the rescheduling queue at the time of the data rate decrease to be sequentially released for use by a receiving device.

In an embodiment, a system for changing queue size values for a retransmission scheme of a communications system includes a retransmission queue at a transmitting device, the retransmission queue having a size equal to a current retransmission queue size value. The system also includes a rescheduling queue at a receiving device, the rescheduling queue having a size equal to a current rescheduling queue size value. The system further includes a queue size determination processor configured to, upon a request to change a data rate for data transmission unit (DTU) transmission, determine queue size value changes for the retransmission queue and the rescheduling queue, such that delay variation is minimized without loss of impulse noise protection. In embodiments, the system can further include a retransmission processor and/or a rescheduling processor to control the retransmission queue and rescheduling queue, respectively. The retransmission processor can change the size of the retransmission queue, and the rescheduling processor can change the size of the rescheduling queue based on the determination made by the queue size determination processor.

Embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the present invention will be described with reference to the accompanying drawings, wherein generally like reference numbers indicate identical or functionally similar elements. Also, generally, the leftmost digit(s) of the reference numbers identify the drawings in which the associated elements are first introduced.

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The presented embodiments are directed to seamless change of retransmission and rescheduling queues in a communication system. The following detailed description refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Introduction/Overview

A communication system is provided in which retransmission and rescheduling queues are seamlessly modified for retransmission of data. More specifically, a purpose of the presented embodiments is to dynamically change the sizes of the retransmission queue and the rescheduling queue during an online reconfiguration due to, for example, a data rate change. There are two main scenarios in which a queue size change would be beneficial. One scenario includes increasing the sizes of the retransmission queue and the rescheduling queue due to in increase in data rate. In this scenario, the queue sizes of the retransmission queue and the rescheduling queue need to increase to maintain impulse noise protection and to insure that the retransmission queue spans a duration greater than a round trip delay. Another scenario includes decreasing the sizes of the retransmission queue and the rescheduling queue due to a decrease in data rate. In this scenario, the queue sizes of the retransmission queue and the rescheduling queue need to decrease to maintain a constraint on the overall maximum delay of the data.

The concept of this invention is similar in theory to the dynamic change of interleaver depth that is specified in International Telecommunication Union (ITU) standard ITU G.993.2. In ITU G.993.2, a delay is allowed to be modified while maintaining impulse noise protection. With the present invention, retransmission and rescheduling queue size is allowed to be modified while maintaining impulse noise protection and the constraint on the overall maximum delay of the data. As a Reed-Solomon codeword (an error-checking code) is fixed during an interleaver depth change, a data transmission unit (DTU) size is fixed during a queue modification.

Although the following description focuses mainly on a retransmission scheme of a DSL (or VDSL) system, it is not to be limited to DSL systems. The concepts described can be applied to any communication system with a transmission mechanism, such as one involving coaxial communications, wireless communications, etc.

Exemplary Data Flow

Figure 1:
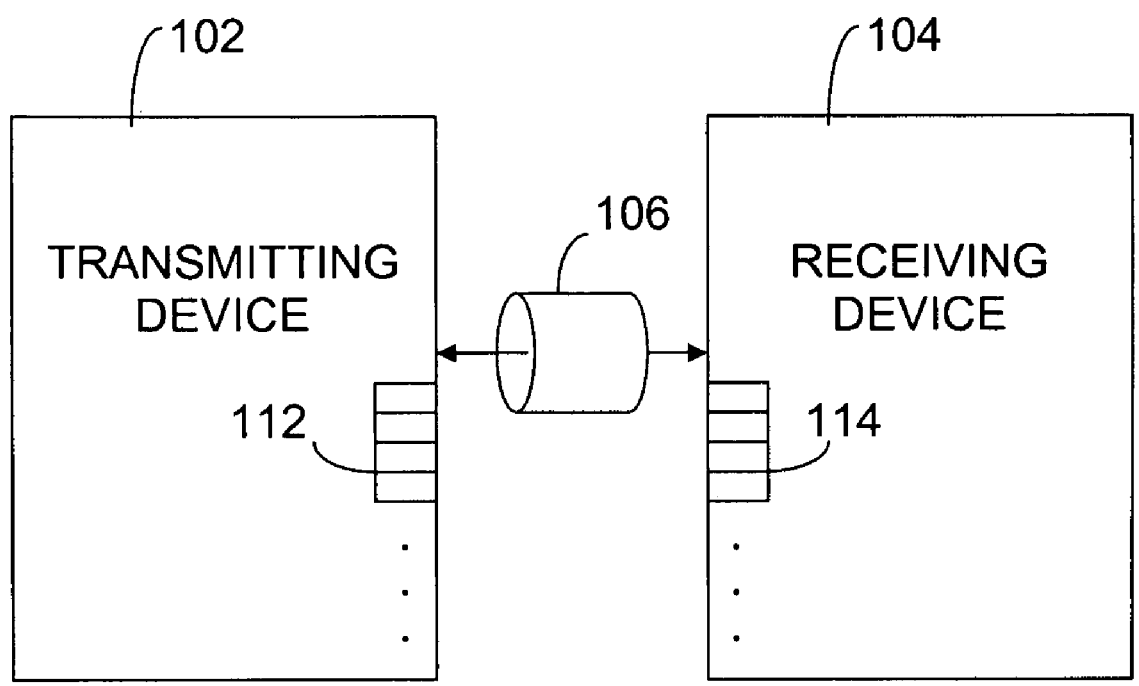
FIGS. 1 and 2 are block diagrams illustrating exemplary communication between a transmitting device and a receiving device, including a retransmission scheme.
Figure 2:
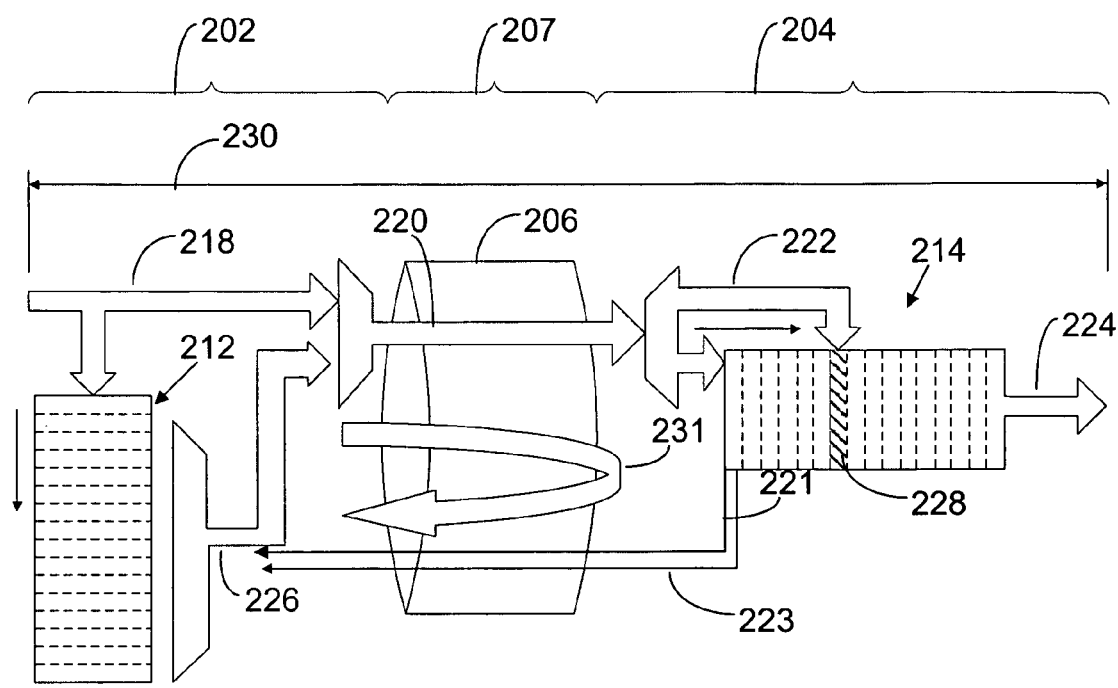

FIGS. 1 and 2 are block diagrams illustrating exemplary communication between a transmitting device and a receiving device, including a retransmission scheme. Referring to FIG. 1, a communication system 100 includes a transmitting device 102 and a receiving device 104. Transmitting device 102 and receiving device 104 can each represent, for example, any computing or electronic devices capable of transmitting and/or receiving a signal, including, but not limited to, telecommunications devices, personal computers or laptops, personal digital assistants (PDAs), commercial servers, cable television devices, etc.

Communications, such as transmissions from transmitting device 102 to receiving device 104, or acknowledgements from receiving device 104 to transmitting device 102, occur via a communications media such as media 106. Media 106 can include DSL cabling, coaxial cabling, twisted pairs, fiber optics, ethernet cabling, etc. Alternatively, the function of media 106 can occur wirelessly. Transmitting device 102 and receiving device 104 can each include transceivers, in which case receiving device 104 could also function as a transmitting device, and transmitting device 102 could also function as a receiving device. For sake of simplicity of description, one-way transmissions from a transmitting device to a receiving device are described, and one-way acknowledgements from a receiving device to a transmitting device are described. One skilled in the art will realize that communication in the other direction would occur in a similar manner. Transmitting device 102 can include a retransmission queue 112, and receiving device 104 can include a rescheduling queue 114, the functions of which will be described in detail in the following paragraphs.

The general principle for an end-to-end retransmission scheme, including portions of a transmitting device and receiving device, is depicted in FIG. 2. As shown by arrow 218, a DTU is released for transmission by a transmitting device 202. Copies of all transmitted DTUs are stored in a retransmission buffer or queue 212 at the transmitting device 202. As shown by arrow 220, the transmitted DTU travels across line 207 via media 206, e.g., a DSL cable. Upon reception of a DTU at the receiving device 204, a frame check sequence (FCS), or any other means to detect a transmission error, of the DTU is checked and a retransmission request 221 is immediately sent to transmitting device 202 if it is found to be corrupted. If it is not corrupted, an acknowledgement of receipt 223 can be sent to transmitting device 202. Even if corrupted, the DTU is pushed into the receive buffer or rescheduling queue 214, as shown by the bottom portion of arrow 222.

Rescheduling queue 214 can be a FIFO buffer of m received DTUs, and should be long enough to allow reception of a retransmission before the DTU leaves the FIFO. For each data block or DTU present in the rescheduling queue 214, the FIFO may be capable of determining whether it contains errors or not. At initialization time, the FIFO may be full of correct dummy data blocks. A deframer (not shown) may therefore not use the first m data blocks that exit the rescheduling queue 214.

An exemplary transmit mechanism is as follows. If no retransmission is pending, new data bytes are stored in a new DTU, and the DTU is transmitted over the line as well as stored in the retransmission queue 212. If, however, a retransmission is requested, two scenarios are possible. In one scenario, the first transmission of the requested DTU took place less than $W_{ret}*T_{dtu}$ seconds before the current time, where $W_{ret}$ denotes the retransmission window size limit in data transmission units (DTUs) (e.g., the size of retransmission queue 212) and $T_{dtu}$ denotes the time it takes for one DTU of data to travel across a certain point. In that case, there is still time (e.g., it is still in retransmission queue 212) and the DTU is retransmitted. In a second scenario, the first transmission of the requested DTU took place more than $W_{ret}*T_{dtu}$ seconds before the current time. In that case, the request is discarded and a new DTU is transmitted.

In other words, upon receipt of a retransmission request 221, the transmitting device can retransmit the DTU, as shown by arrow 226, if there is still time. The retransmitted DTU travels over the line 207 via media 206. If the retransmitted DTU arrives while the corrupted DTU is still present in the rescheduling queue 214 (e.g., at queue location 228), the corrupted DTU is replaced by the retransmitted DTU, as shown by the upper portion of arrow 222. If the retransmitted DTU does not arrive on time, the corrupted data will be further processed by the receiver data path when the original DTU is provided to the receiver data path, as shown by arrow 224.

Receiving device 204 may also verify the correctness of a sequence identification (SID) present in a retransmit container containing the retransmitted DTU. At that point, the receiver may have information regarding whether a Reed-Solomon codewords (used for error-checking) may be uncorrectable and whether the SID may have been corrupted during the transmission.

In FIG. 2, arrow 230 represents a maximum delay, which is equal to the delay between when a DTU is first transmitted (and a copy is pushed into the retransmission queue 212), as shown by arrow 218, and when the data unit is provided by the rescheduling queue 214 for processing by the receiving device 204, as shown by arrow 224. Arrow 231 represents a roundtrip delay, which is equal to the delay between when a DTU is first transmitted (and a copy is pushed into the retransmission queue 212), as shown by arrow 218, and when an acknowledgment is received from the receiving device 204, as shown by arrow 223. A retransmission request 221 can also be considered an acknowledgement for purposes of determining roundtrip delay.

Receiving DTUs at Receiving Device

Upon receiving data, the DTU or data block may be checked by receiving device 204 for errors and different actions may be taken based on whether or not errors are present. If there is an unrecoverable error in one of the Reed-Solomon codewords or in the received SID, for example, the data block can be pushed into rescheduling queue 214 as being the next expected data block (tail of the FIFO), and the data block can be marked in rescheduling queue 214 as being erroneous. If rescheduling queue 214 contains at least one correct data block, a retransmission request can be sent to the transmitting device. If, however, rescheduling queue 214 only contains incorrect data blocks, there may be a high probability that a retransmission may not occur in time, and consequently, the retransmission may be disabled until the rescheduling queue 214 is again partially filled with correct DTUs.

Upon examining the DTU data, it may be determined that there are no residual errors in the DTU. In this case, the SID is equal to the next expected SID. Consequently, the data block may be pushed into rescheduling queue 214 and marked as being correct.

In another situation, upon examining the data, it may be determined that the SID is not the expected one and retransmission may be needed. If the SID does not match an index in rescheduling queue 214, the DTU may be dropped if there is no correct data block in the FIFO. This may effectively result in recovering a potentially lost synchronization in case of a long period with errors. The received codeword may be dropped until synchronization is achieved again. When repetition is handled at the TPS-TC level, resynchronization may not be needed and the received data block may be immediately pushed inside rescheduling queue 214. However, if there are some correct data blocks in the FIFO, the received data block may be pushed at the beginning of the queue, and marked as being incorrect, without asking for retransmit.

Alternatively, if it is determined that the SID may not be the expected one, retransmission may be needed. If a correct data block is already present in rescheduling queue 214 at the location corresponding to the received data block, it may be concluded that a data block for which retransmission was not requested may have been received.

This data block may be pushed at the beginning of the FIFO and marked as being incorrect. Still further, if it is determined that the SID may not be the expected one and retransmission may be needed, and if the data block present in the FIFO at the location corresponding to the received data block is marked as being incorrect, it may be replaced and marked as correct.

Exemplary Retransmission Scheme

Any retransmission scheme relies on feedback from a receiving device. This feedback must be highly reliable. In an example, transmitting device 202 receives a retransmission request 221 from receiving device 204. Retransmission request 221 could have different characteristics. For example, it is desirable to have redundancy in the request. As such, notice that a DTU has to be retransmitted is preferably contained in multiple requests such that if some requests get lost, there is still a possibility to receive the retransmission notice. Further, retransmission request 221 preferably requires as small a bit rate as possible in order to minimize overhead (e.g., 2 or 3 bytes per symbol in various embodiments). Therefore, the format should be dense and the request should contain as much information as possible. In other words, best use should be made of available overhead. Still further, the information contained in retransmission request 221 should be understandable and meaningful independently of the history. In other words, retransmission request 221 is preferably self meaningful and not dependent on any previously transmitted request. Finally, retransmission request 221 should be protected by some kind of error check, such as a check sum, so that transmitting device 202 and/or receiving device 204 can discriminate between correct and erroneous requests with a high reliability.

When sending a retransmission request 221, the retransmission signal may indicate the retransmit container ID, the last container ID to be retransmitted, and the number of containers to be retransmitted after that container. The signal may also comprise the last received container ID, and a bitmap indicating which container needs to be retransmitted. For example, if the last container ID is Cid, bit I of the bitmap then can be set to 1 if Cid-I needs to be retransmitted.

Support for a retransmission scheme in addition to a standard interleaving mode may be negotiated during a handshake in the communication system. Once established, the transmitting device 202 and the receiving device 204 may respectively announce support for this mode in the receive direction, support for this mode in the transmit direction, their own worst case half-way roundtrip delay, and the maximum size of the retransmission FIFO or queue 212 at the transmitting side.

The system shown in FIG. 2 is an exemplary system showing a general principle for end-to-end retransmission. FIG. 2 is not meant to show or describe the invention, but is provided to describe some basic information with regard to retransmission.

Embodiments of the present invention will now be described in the following sections.

Seamless Rate Adaptation—Steady State

Figure 3:
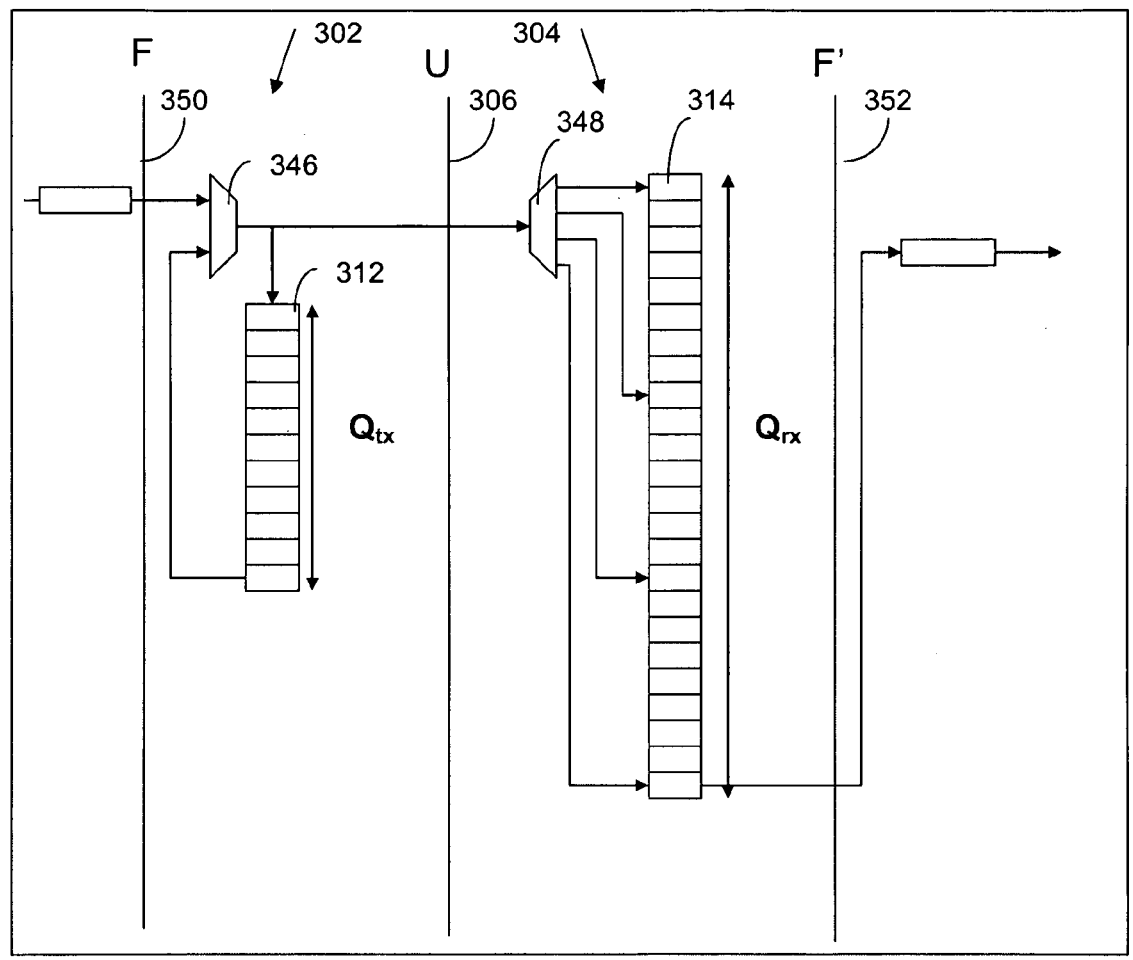
FIG. 3 is a block diagram illustrating exemplary communication between a transmitting device and a receiving device, with a retransmission scheme in steady state, according to an embodiment of the present invention.

FIG. 3 is a block diagram illustrating exemplary communication between a transmitting device 302 and a receiving device 304, with a retransmission scheme in steady state, according to an embodiment of the present invention. As shown in FIG. 3, a new DTU is provided by a transmitting device across interface 350 (interface "F"). A decision device 346, such as a multiplexing device, decides whether to transmit the new DTU or retransmit a previously transmitted DTU from a retransmission queue 312. Retransmission queue 312 is of size $Q_{tx}$ (in DTUs). The new DTU, or the retransmitted DTU, is sent over the line 306 (interface "U") and received by a demultiplexing device 348 at the receiving device for placement in a rescheduling queue 314. Rescheduling queue 314 is of size $Q_{rx}$ (in DTUs). From rescheduling queue 314, a DTU is provided for use by the receiving device over interface 352 (interface "F"). Error-checking at the receiving device can be done, and an acknowledgement of receipt or a retransmission request can be sent from the receiving device to the transmitting device, as previously discussed.

In steady-state, any new DTU entering interface 350 will exit interface 352 exactly $Q_{rx}$ times $T_{dtu}$ (where $T_{dtu}$ is the time for one DTU to travel across a certain point) microseconds later, independently of the number of retransmissions that can occur during this time. Every time a DTU is sent over the line 306, the DTU at the end of retransmission queue 312 is checked. If this DTU can be handled by rescheduling queue 314 and still exit interface 352 in time, and is not acknowledged, this DTU is retransmitted over the line instead of pulling a new DTU across interface 350. Any DTU sent over line 306, a retransmission DTU or a new DTU, is pushed at the beginning of the retransmission queue, and the DTU at the end of the retransmission queue is dropped.

The above describes a steady-state communication system using a retransmission scheme. In the steady-state system, the data rate (i.e., the number of bits per symbol) for DTU transmission is approximately constant. If there is a need to change the data rate, e.g., due to improving or worsening line conditions, it can be beneficial to change the sizes of the retransmission and rescheduling queues, accordingly. For example, a receiving device may detect a changing line condition and may send a request to the transmitting device to change the data rate accordingly. If the data rate increases, it can be useful to increase the sizes of the retransmission and rescheduling queues such that the retransmission queue size is large enough to outlast the roundtrip delay, such that the impulse noise protection is maintained, and such that the delay variation is limited. In the alternative, if the data rate decreases, it can be useful to decrease the sizes of the retransmission and rescheduling queues in order to continue to adhere to the maximum delay.

For a change in size of the retransmission and rescheduling queues to occur, the new queue sizes need to be determined. In an embodiment of the present invention, a processor 411/

Figure 4:
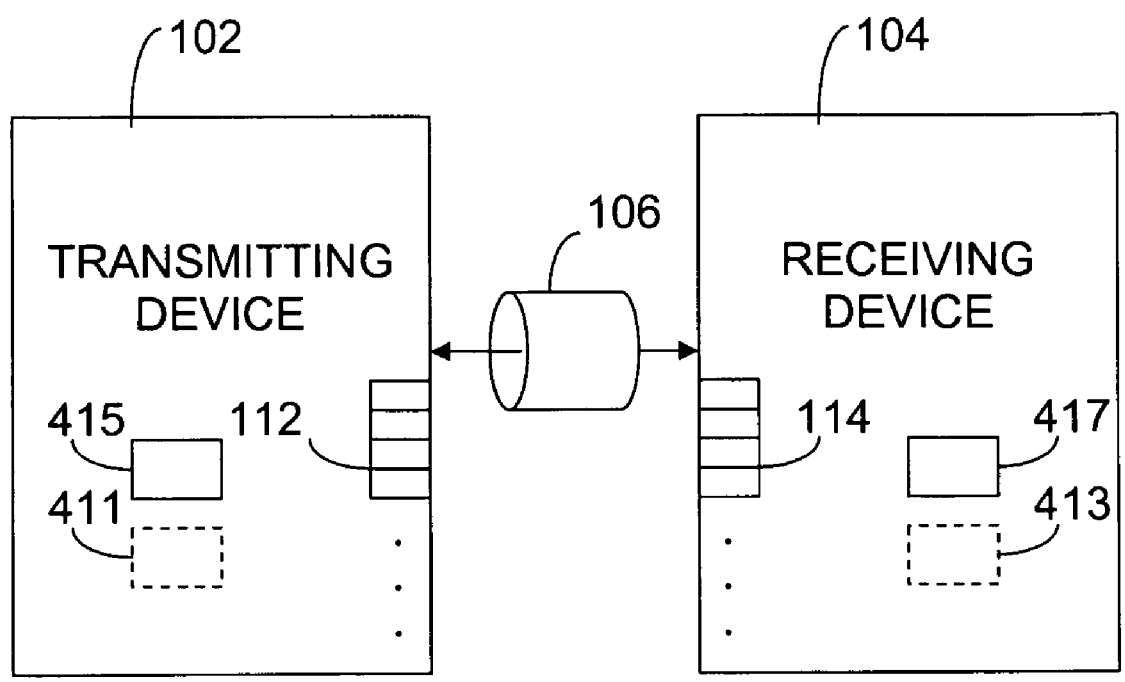
FIG. 4 is a block diagram illustrating exemplary communication between a transmitting device and a receiving device, according to embodiments of the present invention.

413 (in FIG. 4) located at either the transmitting device or the receiving device determines the new retransmission and rescheduling queue sizes. According to an embodiment, if at the transmitting device, the processor can be the same processor that controls the retransmission queue, denoted as processor 415. According to another embodiment, if at the receiving device, the processor can be the same processor that controls the rescheduling queue, denoted as processor 417. The new retransmission and rescheduling queue sizes can be communicated between the transmitting device and the receiving device. The following sections describe the changing of the retransmission and rescheduling queue sizes.

Seamless Rate Adaptation—Data Rate Increase

Figure 5:
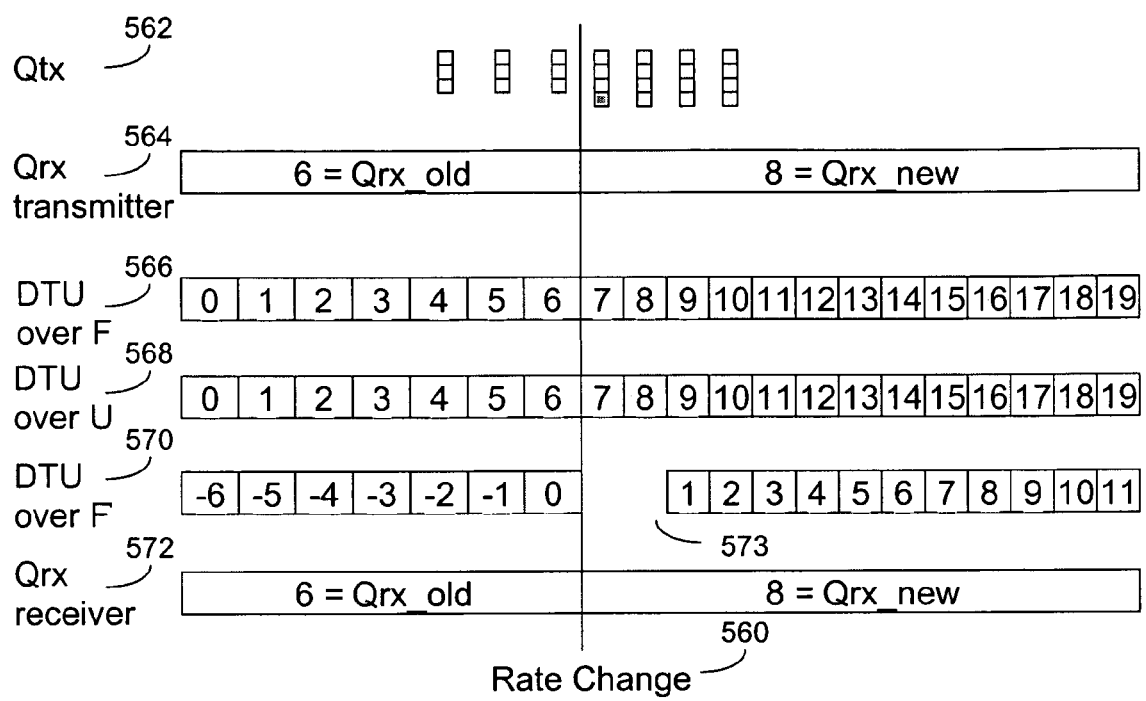
FIG. 5 is a timing diagram illustrating queue size changes for an increase in data rate, according to an embodiment of the present invention.

For an increase in data rate, a new retransmission queue size $Q_{tx\_}$new and a new rescheduling queue size $Q_{rx\_}$new are determined such that an amount of time for a copy of a transmitted DTU to enter and exit the retransmission queue is greater than the roundtrip delay. FIG. 5 is a timing diagram illustrating queue size changes for an increase in data rate, according to an embodiment of the present invention. In FIG. 5, the change in retransmission queue size 562 ("$Q_{tx}$") is shown at the top in DTU increments.

Below that, the size 564 of the rescheduling queue as seen at the transmitting device ("$Q_{rx}$ transmitter") per DTU increment is shown. Below that, the DTUs 566 sent over interface F are shown. Below that, the DTUs 568 sent over the line ("U") are shown. Below that, the DTUs 570 sent over interface F' are shown. At the bottom, the change in rescheduling queue size 572 as seen at the receiving device ("$Q_{rx}$ receiver") is shown. The process shown in FIG. 5 will be described in detail in the following paragraphs.

At the time 560 of the rate increase, placeholder DTU spaces (i.e., dummy DTUs) in an amount equal to ($Q_{tx\_}$old-$Q_{tx\_}$new) are added at the end of the retransmission queue. In FIG. 5, the current (or old) size ($Q_{tx\_}$old) of the retransmission queue is 3 DTUs, and $Q_{tx\_}$new is 4 DTUs. Therefore, the number of placeholder DTU spaces added to the retransmission queue is (4-3), or 1 DTU, as shown by the darkened spot in the retransmission queue just after the rate change 560. The placeholder DTU spaces are simply placeholders and will not be retransmitted. Therefore, the next $Q_{tx\_}$new-$Q_{tx\_}$old DTUs transmitted over the line ("U") are all new DTUs pulled from the F interface. After the $Q_{tx\_}$new-$Q_{tx\_}$old DTUs are transmitted (and copies are pushed into the retransmission queue), the retransmission queue has acquired its new size and the placeholder DTU spaces are pushed out of the retransmission queue.

At the receiving side, after the rate change 560, the rescheduling queue does not output DTUs across the F' interface during $Q_{rx\_}$new-$Q_{rx\_}$old DTUs (as can be seen by space 573), and at the same time the length of the rescheduling queue is increased to $Q_{rx\_}$new. In the example shown in FIG. 5, $Q_{rx\_}$old is 6 DTUs and $Q_{rx\_}$new is 8 DTUs. Therefore, after the rate change 560, the rescheduling queue does not output DTUs across the F' interface during the time it would take 2 DTUs (8 minus 6) to be output.

In an embodiment, if the DTUs contained timestamps, then the timestamps of all DTUs in the retransmission and rescheduling queues are increased just after the rate change 560 by $Q_{rx\_}$new-$Q_{rx\_}$old. In the example shown in FIG. 5, the timestamps would be increased by the time it would take 2 DTUs (8 minus 6) to be output from the rescheduling queue.

The maximum delay variation from its original delay of one DTU during this process is equal to ($Q_{rx\_}$new-$Q_{rx\_}$old) times $T_{dtu\_}$new, where $T_{dtu\_}$new is the duration or time it takes for one DTU to travel across a certain point (e.g., the "U" interface), after the rate change. In the example shown in FIG. 5, the maximum delay variation would be equal to 2 times $T_{dtu\_}$new.

Seamless Rate Adaptation—Data Rate Decrease

Figure 6:
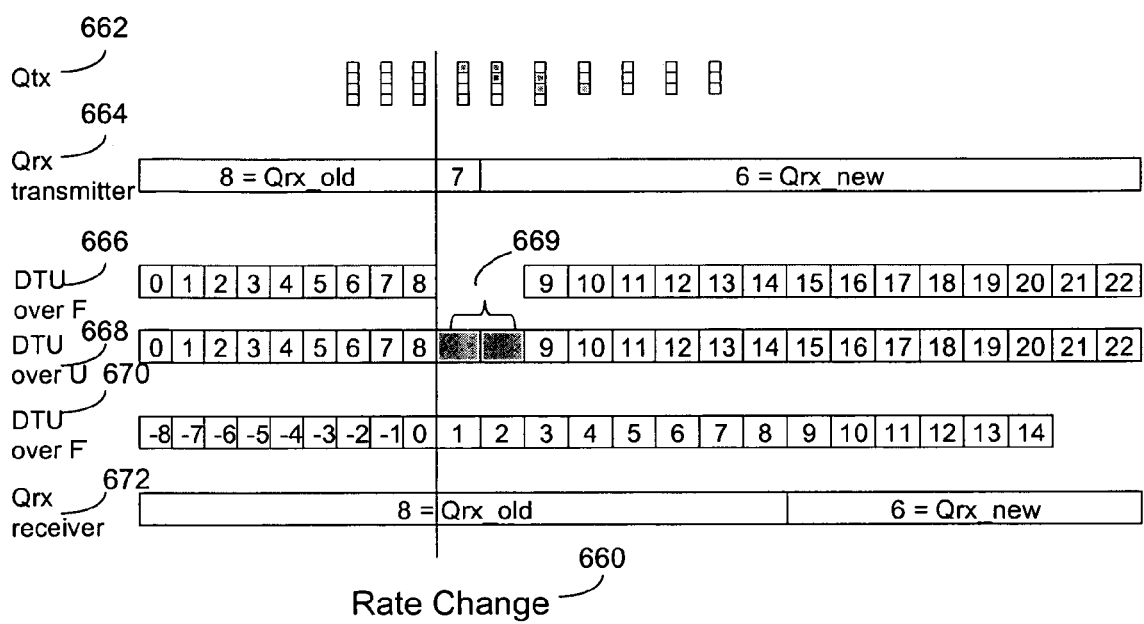
FIG. 6 is a timing diagram illustrating queue size changes for a decrease in data rate with no retransmissions, according to an embodiment of the present invention.

For a decrease in data rate, a new retransmission queue size $Q_{tx\_}$new and a new rescheduling queue size $Q_{rx\_}$new are determined such that an amount of time for a DTU to enter and exit the retransmission queue is less than the maximum delay. FIG. 6 is a timing diagram illustrating queue size changes for a decrease in data rate, according to an embodiment of the present invention. In FIG. 6, the change in retransmission queue size 662 ("$Q_{tx}$") is shown at the top in DTU increments. Below that, the size 664 of the rescheduling queue as seen at the transmitting device ("$Q_{rx}$ transmitter") per DTU increment is shown. Below that, the DTUs 666 sent over interface F are shown. Below that, the DTUs 668 sent over the line ("U") are shown. Below that, the DTUs 670 sent over interface F' are shown. At the bottom, the change in rescheduling queue size 672 as seen at the receiving device ("$Q_{rx}$ receiver") is shown. The process shown in FIG. 6 will be described in detail in the following paragraphs.

At the time 660 of the rate decrease, each time a new DTU should cross the F interface at the transmitting device (i.e., retransmission of a previously transmitted DTU is not needed), a placeholder DTU (i.e., dummy DTU) is generated instead. These placeholder DTUs are valid DTUs that are sent over the line ("U") and pushed into the retransmission queue. When a placeholder DTU is generated, the size value $Q_{rx}$ of the rescheduling queue, as seen by the transmitting device, is decreased by one. This is repeated until the value of $Q_{rx}$, as seen by the transmitter, is equal to $Q_{rx\_}$new. In the example shown in FIG. 6, the current value of $Q_{rx}$ ($Q_{rx\_}$old) is equal to 8 DTUs, and $Q_{rx\_}$new is equal to 6 DTUs. Therefore, there are two (8 minus 6) placeholder DTUs 669 generated and sent over the line ("U"). When the first placeholder DTU is sent over the line, the value of $Q_{rx}$ (as seen by the transmitting device ($Q_{rx}$ transmitter 664)) is decreased from 8 to 7. When the second placeholder DTU is sent over the line, the value of $Q_{rx}$ (as seen by the transmitting device ($Q_{rx}$ transmitter 664)) is decreased from 7 to 6, which is the value of $Q_{rx\_}$new. In embodiments, as valid DTUs, each placeholder DTU can be, for example, a copy of a DTU that would be redundant to the receiving device, such as a copy of the last transmitted DTU or a copy of a DTU with a high sequence identifier (SID). In an embodiment, a placeholder DTU can be indicated as a placeholder DTU by setting a flag in the retransmission container of the placeholder DTU.

Figure 7:
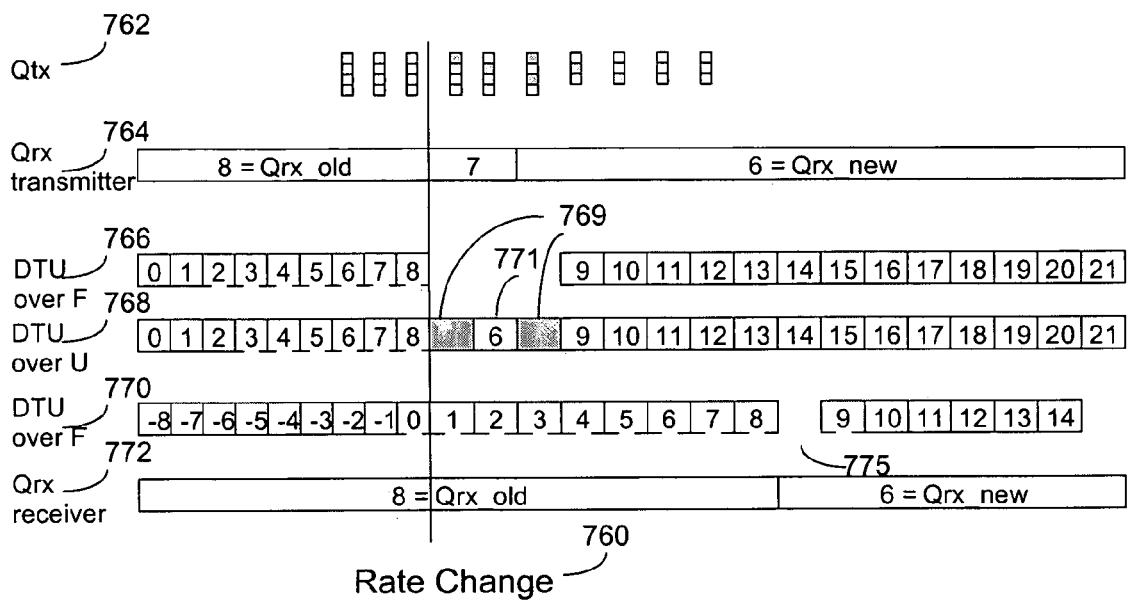
FIG. 7 is a timing diagram illustrating queue size changes for a decrease in data rate with a retransmission occurrence, according to an embodiment of the present invention.

Meanwhile, each DTU is checked at the end of the retransmission queue. Depending on the type of DTU and the current state of the system, a particular course of action is taken, as further discussed with regard to FIGS. 11A and 11B below. The checking of a subsequent DTU at the end of the retransmission queue is repeated, and the appropriate action is taken, until the current retransmission queue size value ($Q_{tx}$) equals the new retransmission queue size value ($Q_{tx\_}$new) and current rescheduling queue size value ($Q_{rx}$) equals the new rescheduling queue size value ($Q_{rx\_}$new). In the example shown in FIG. 6, the current value of $Q_{tx}$ ($Q_{tx\_}$old) is equal to 4 DTUs, and $Q_{tx\_}$new is equal to 3 DTUs. In this case, $Q_{tx\_}$new is reached after the first placeholder DTU is checked. FIG. 7, discussed below, shows an example where a DTU is retransmitted during the queue size decrease process.

At the receiving side, the values of $Q_{rx}$ and $Q_{tx}$ cannot be modified until after all of the placeholder DTUs are sent and have made their way to the bottom of the rescheduling queue. In other words, $Q_{rx}$ and $Q_{tx}$ are modified after $Q_{rx\_}$old DTUs are sent over the F' interface following the data rate decrease.

In the example shown in FIG. 6, the current size of the rescheduling queue $Q_{rx}$ ($Q_{rx}$_old) is 8, and $Q_{rx}$_new is 6. As can be seen in FIG. 6, just after the rate change 660, eight DTUs are sent over the F' interface before the new queue size of six DTUs is to take effect. At that time, the two placeholder DTUs 669 are at the bottom of the rescheduling queue and discarded.

Although placeholder DTUs are not retransmitted, real DTUs can be retransmitted during the process of decreasing the sizes of the retransmission and rescheduling queues. An example of this is shown in FIG. 7.

FIG. 7 is a timing diagram illustrating queue size changes for a decrease in data rate with a retransmission occurrence, according to an embodiment of the present invention. In FIG. 7, the change in retransmission queue size 762 ("$Q_{tx}$") is shown at the top in DTU increments. Below that, the size 764 of the rescheduling queue as seen at the transmitting device ("$Q_{rx}$ transmitter") per DTU increment is shown. Below that, the DTUs 766 sent over interface F are shown. Below that, the DTUs 768 sent over the line ("U") are shown. Below that, the DTUs 770 sent over interface F' are shown. At the bottom, the change in rescheduling queue size 772 as seen at the receiving device ("$Q_{rx}$ receiver") is shown. The process shown in FIG. 7 is essentially the same process as that described above with reference to FIG. 6. However, FIG. 7 shows a scenario where a DTU 771 with SID=6 is retransmitted during the rescheduling queue size transition. In this scenario, DTU 771 is retransmitted between the transmissions of placeholder DTUs 769. The only difference in the functioning of the rescheduling queue is that a delay 775 of 1 DTU was caused in the transferring of DTUs over interface F' due to replacement DTU 771 being placed in sequence.

The maximum delay variation from its original delay of one DTU during this process (independent of whether there were retransmissions during the process) is equal to ($Q_{rx}$_old- $Q_{rx}$_new) times $T_{dtu}$_new. Therefore, in the example shown in FIGS. 6 and 7, the maximum delay variation would be equal to 2 times $T_{dtu}$_new.

Seamless Rate Adaptation—Exemplary Method(s)

Further to the above descriptions of seamless rate adaptation, the following paragraphs describe methods for changing retransmission and rescheduling queue size values and also for changing the queue sizes once the new queue size values have been determined.

Figure 8:
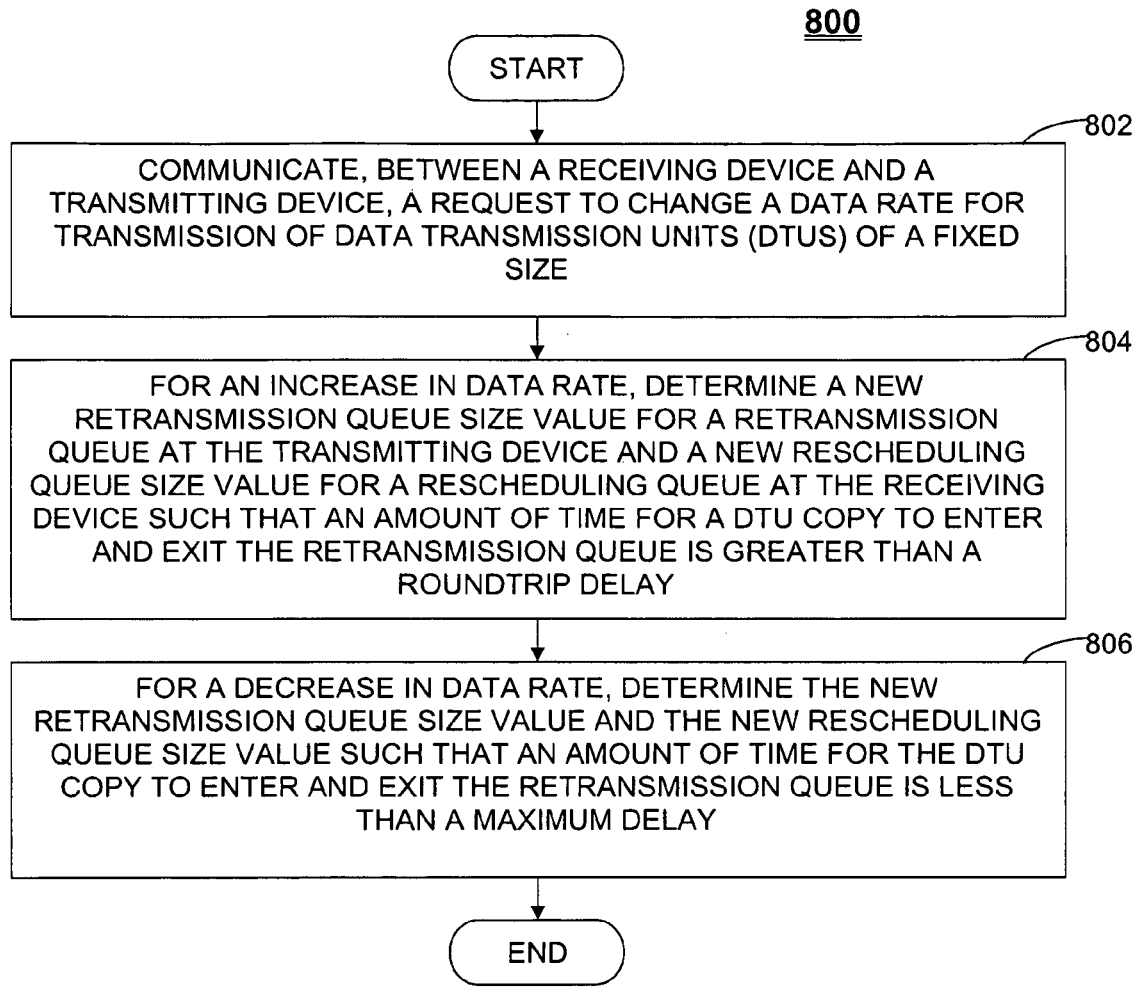
FIG. 8 is a flowchart depicting a method for changing queue size values, according to an embodiment of the present invention.

FIG. 8 is a flowchart depicting a method 800 for changing queue size values, according to an embodiment of the present invention. In step 802, a request to change a data rate for transmission of data transmission units (DTUs) is communicated between a receiving device and a transmitting device. For example, the receiving device may request a data rate change due to conditions on the line between the receiving device and the transmitting device. Alternatively, the transmitting device may communicate a data rate change to the receiving device.

In step 804, for an increase in data rate, a new retransmission queue size value for a retransmission queue at the transmitting device and a new rescheduling queue size value for a rescheduling queue at the receiving device are determined such that an amount of time for a DTU to enter and exit the retransmission queue is greater than the roundtrip delay. As described above, the roundtrip delay is the delay between when a DTU is first transmitted (and a copy is pushed into the retransmission queue) and when an acknowledgment is received from the receiving device. In an embodiment, the queue size values are determined at the transmitting device. In another embodiment, the queue size values are determined at the receiving device.

In step 806, for a decrease in data rate, the new retransmission queue size value and the new rescheduling queue size value are determined such that an amount of time for a DTU to enter and exit the retransmission queue is less than a maximum delay. As described above, the maximum delay is the delay between when a DTU is first transmitted (and a copy is pushed into the retransmission queue) and when the DTU is provided to the receiving device by the rescheduling queue. In an embodiment, the queue size values are determined at the transmitting device. In another embodiment, the queue size values are determined at the receiving device.

Figure 9:
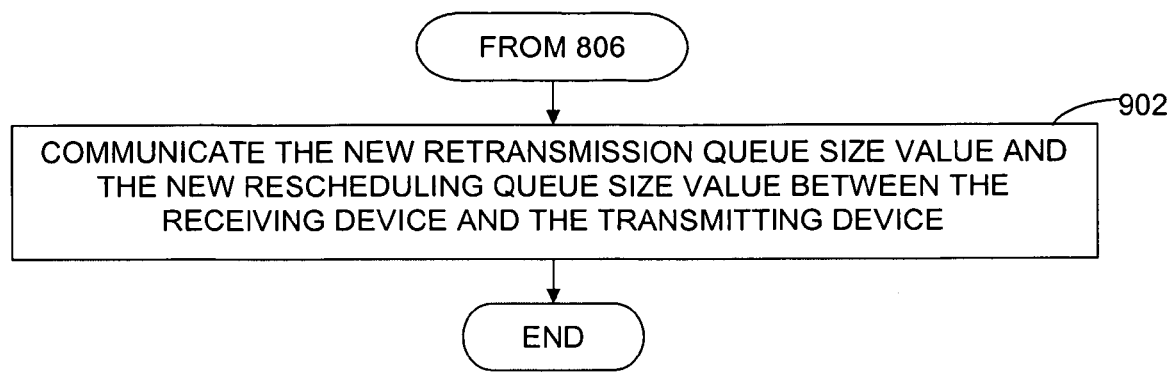
FIG. 9 is a flowchart depicting a further step to the method shown in FIG. 8, according to an embodiment of the present invention.

FIG. 9 is a flowchart depicting a further step to method 800, according to an embodiment of the present invention. In step 902, the new retransmission queue size value and the new rescheduling queue size value are communicated between the receiving device and the transmitting device.

Figure 10:
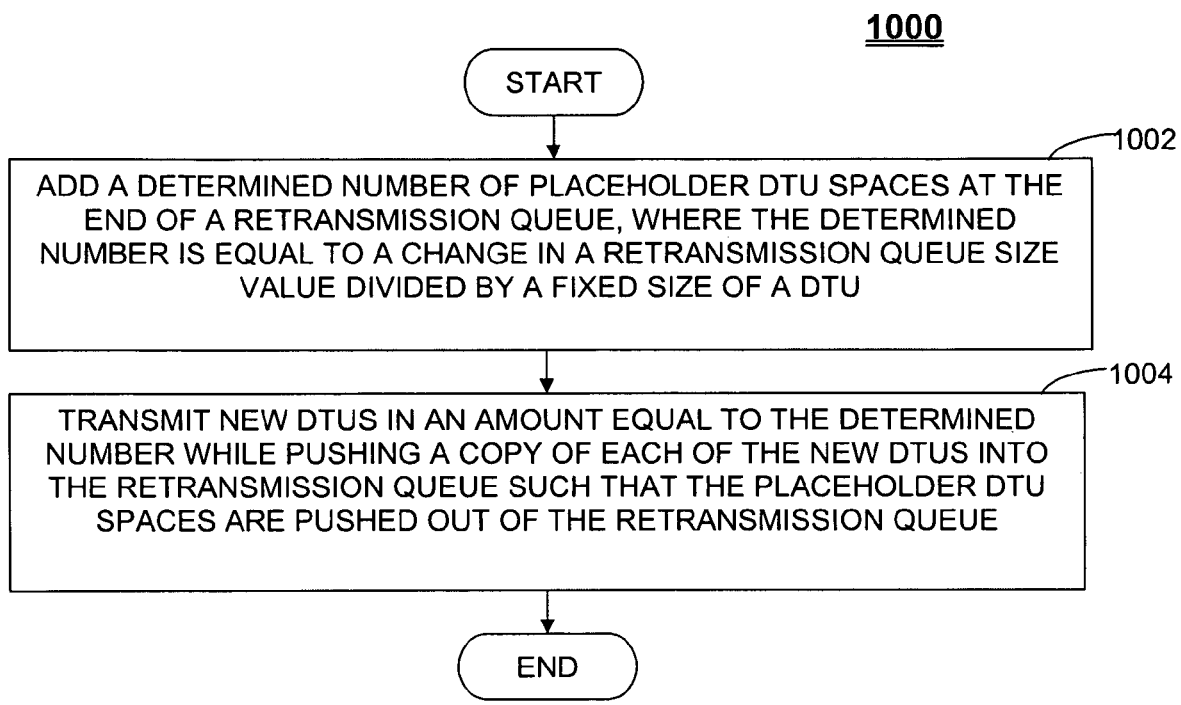
FIG. 10 is a flowchart depicting a method for changing a size of a retransmission queue due to an increase in data rate, according to an embodiment of the present invention.

FIG. 10 is a flowchart depicting a method 1000 for changing a size of a retransmission queue due to an increase in data rate, according to an embodiment of the present invention. In method 1000, the size of the retransmission queue is changed based on a new transmission queue size value that has been previously determined, e.g., using method 800. In step 1002, a determined number of placeholder DTU spaces is added at the end of a retransmission queue, where the determined number is equal to a change in the retransmission queue size value divided by the fixed size of a DTU. In an embodiment, the change in the retransmission queue size value can be equal to the difference between the previously determined new retransmission queue size value and a current retransmission queue size value (i.e., the retransmission queue size value prior to this rate increase). In step 1004, new DTUs, in an amount equal to the determined number, are transmitted while a copy of each of the new DTUs is pushed into the retransmission queue such that the placeholder DTU spaces are pushed out of the retransmission queue. If timestamps are used, they will need to be corrected in accordance with the queue size change. Thus, in an embodiment, timestamps of each DTU in the retransmission queue is increased by a difference between the new rescheduling queue size value and the current rescheduling queue size value.

Figure 11A:
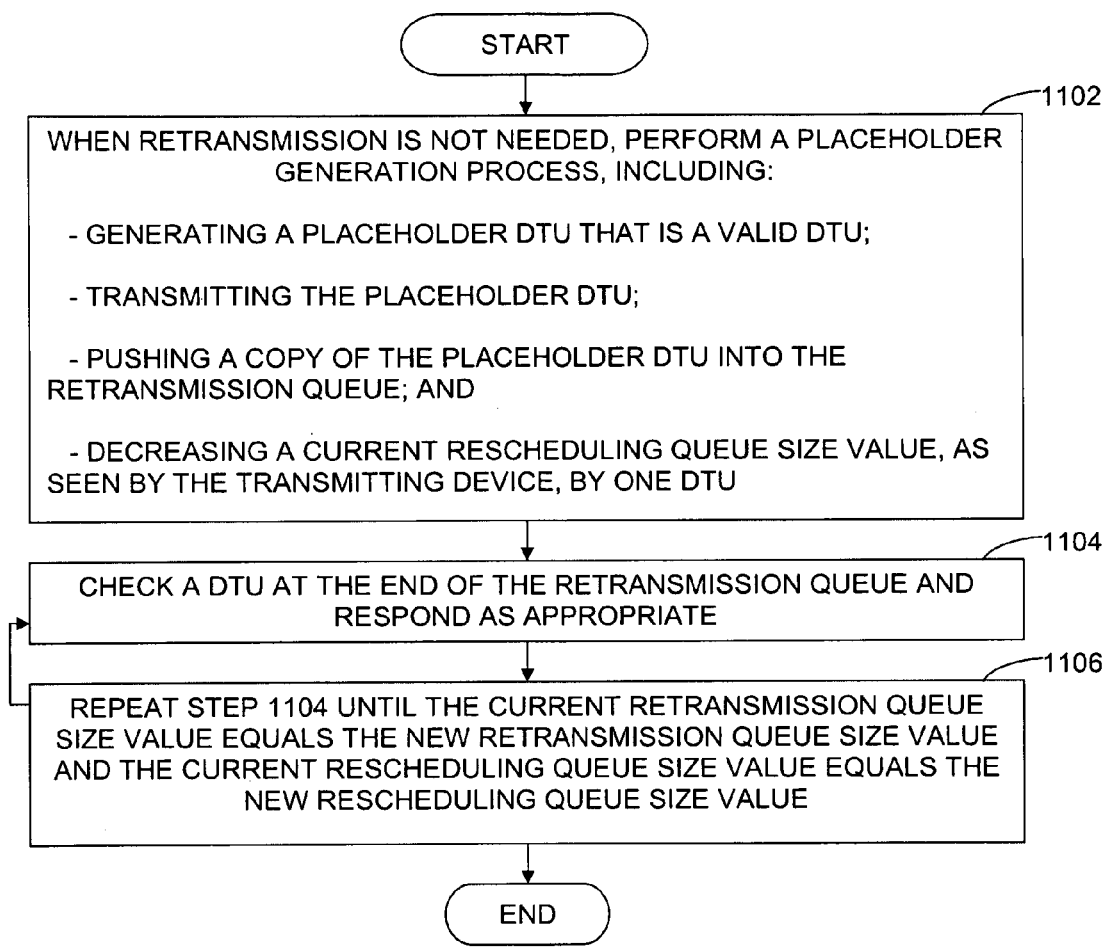
FIGS. 11A and 11B are flowcharts depicting a method for changing a size of a retransmission queue due to a decrease in data rate, according to an embodiment of the present invention.
Figure 11B:
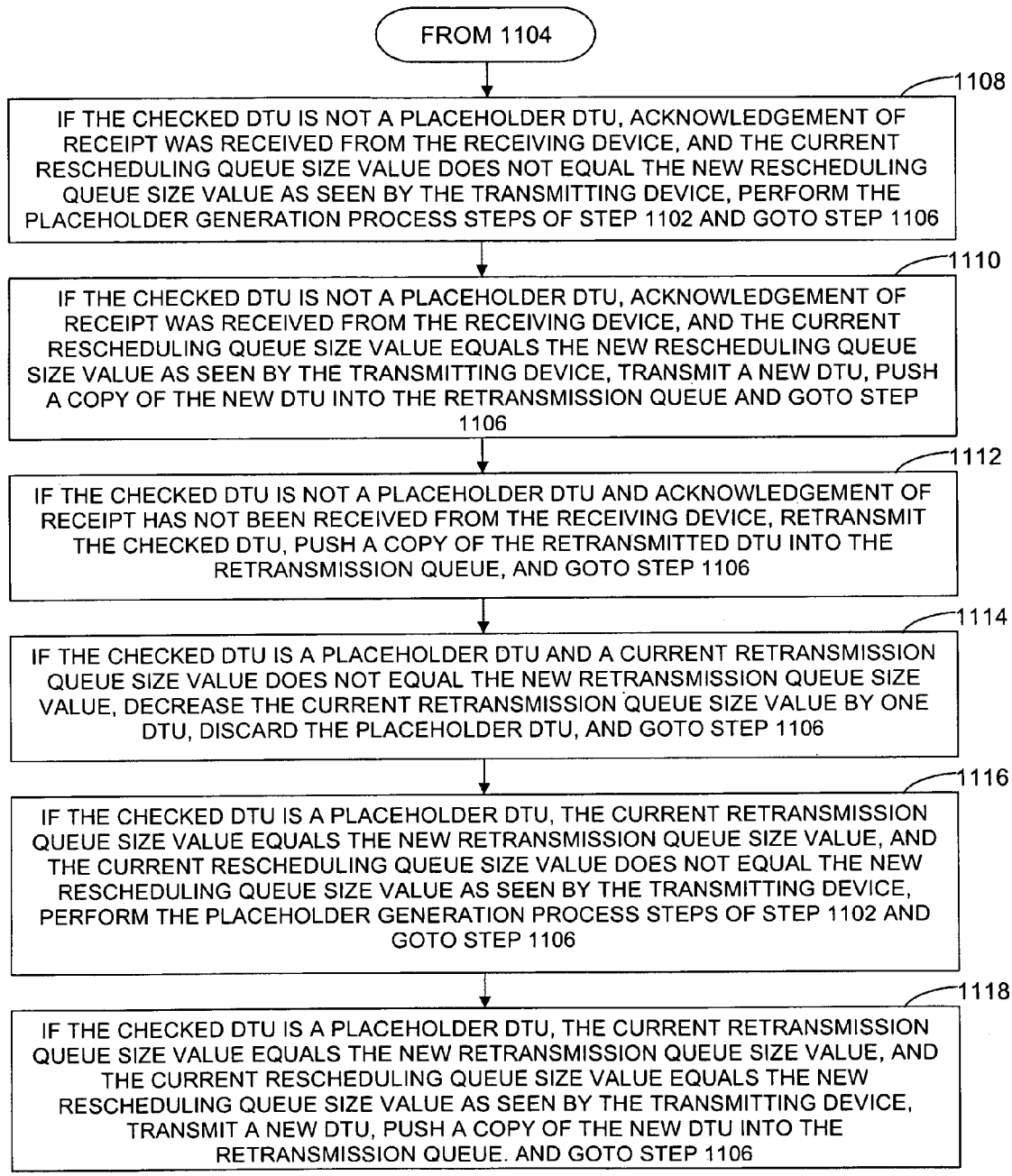

FIGS. 11A and 11B are flowcharts depicting a method 1100 for changing a size of a retransmission queue due to a decrease in data rate, according to an embodiment of the present invention. In method 1100, the size of the retransmission queue is changed based on a new transmission queue size value that has been previously determined, e.g., using method 800. In step 1102, when retransmission is not needed, a placeholder generation process is performed, including generating a placeholder DTU for transmission. In an embodiment, the placeholder DTU is a valid DTU that would be considered redundant to the receiving device, such as, for example, a duplicate of the last transmitted DTU or a duplicate of a previously transmitted DTU that has the highest DTU sequence. In an embodiment, a placeholder DTU can be denoted as a placeholder DTU by a flag in its retransmission container. The placeholder generation process further includes transmitting the placeholder DTU, pushing a copy of the placeholder DTU into the retransmission queue, and decreasing a current rescheduling queue size value, as seen by the transmitting device, by one DTU.

In step 1104, a DTU at the end of the retransmission queue is checked, and an appropriate course of action is taken, depending on the current state of the system. In an embodiment, the appropriate courses of action are as shown in FIG. 11B. In step 1108 of FIG. 11B, if the checked DTU is not a placeholder DTU, acknowledgement of receipt was received from the receiving device, and the current rescheduling queue size value does not equal the new rescheduling queue size value as seen by the transmitting device, the generating, transmitting, pushing, and decreasing steps of the placeholder generation process of step 1102 is performed. In step 1110, if the checked DTU is not a placeholder DTU, acknowledgement of receipt was received from the receiving device, and the current rescheduling queue size value equals the new rescheduling queue size value as seen by the transmitting device, a new DTU is transmitted and a copy of the new DTU is pushed into the retransmission queue. In step 1112, if the checked DTU is not a placeholder DTU and acknowledgement of receipt has not been received from the receiving device, the checked DTU is retransmitted and a copy of the retransmitted DTU is pushed into the retransmission queue. In step 1114, if the checked DTU is a placeholder DTU and a current retransmission queue size value does not equal the new retransmission queue size value, the current retransmission queue size value is decreased by one DTU and the placeholder DTU is discarded. In step 1116, if the checked DTU is a placeholder DTU, the current retransmission queue size value equals the new retransmission queue size value, and the current rescheduling queue size value does not equal the new rescheduling queue size value as seen by the transmitting device, the generating, transmitting, pushing, and decreasing steps of the placeholder generation process of step 1102 is performed. In step 1118, if the checked DTU is a placeholder DTU, the current retransmission queue size value equals the new retransmission queue size value, and the current rescheduling queue size value equals the new rescheduling queue size value as seen by the transmitting device, a new DTU is transmitted and a copy of the new DTU is pushed into the retransmission queue. After execution of the appropriate course of action from any one of steps 1108 through 1118, method 1100 continues at step 1106.

In step 1106, step 1104 is repeated until the current retransmission queue size value equals the new retransmission queue size value and the current rescheduling queue size value equals the new rescheduling queue size value. Method 1100 then ends.

Figure 12:
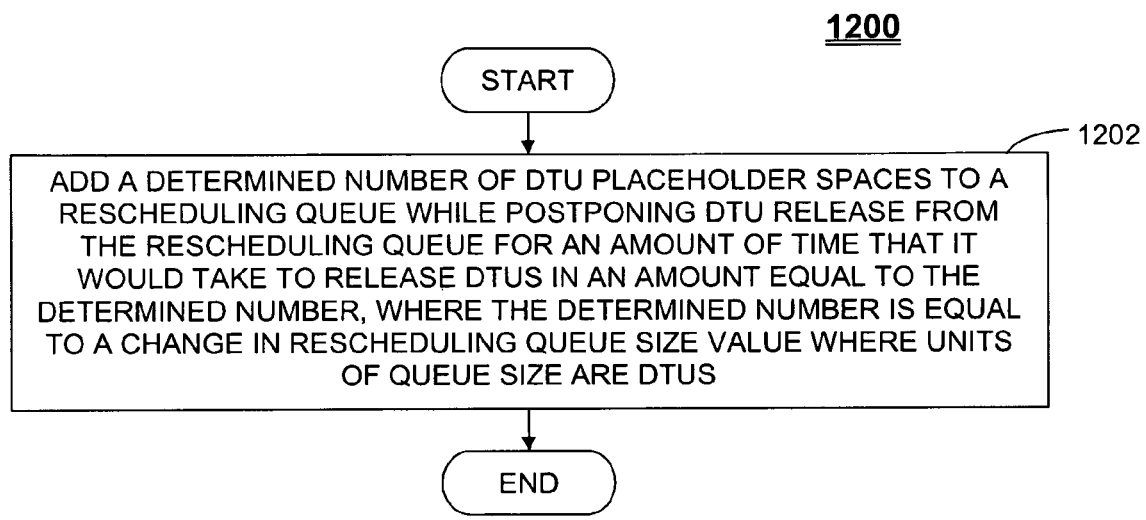
FIG. 12 is a flowchart depicting a method for changing a size of a rescheduling queue due to an increase in data rate, according to an embodiment of the present invention.

FIG. 12 is a flowchart depicting a method 1200 for changing a size of a rescheduling queue due to an increase in data rate, according to an embodiment of the present invention. In method 1200, the size of the rescheduling queue is changed based on a new rescheduling queue size value that has been previously determined, e.g., using method 800. In step 1202, a determined number of DTU placeholder spaces is added to the rescheduling queue while postponing DTU release from the rescheduling queue for an amount of time that it would take to release DTUs in an amount equal to the determined number, where the determined number is equal to a change in rescheduling queue size value where units of queue size are DTU. In an embodiment, the change in the rescheduling queue size value can be equal to the difference between the previously determined new rescheduling queue size value and a current retransmission queue size value (i.e., the rescheduling queue size value prior to this rate increase). As with the retransmission queue, if timestamps are used, they will need to be corrected in accordance with the queue size change. Thus, in an embodiment, timestamps of each DTU in the rescheduling queue is increased by a difference between the new rescheduling queue size value and the current rescheduling queue size value.

Figure 13:
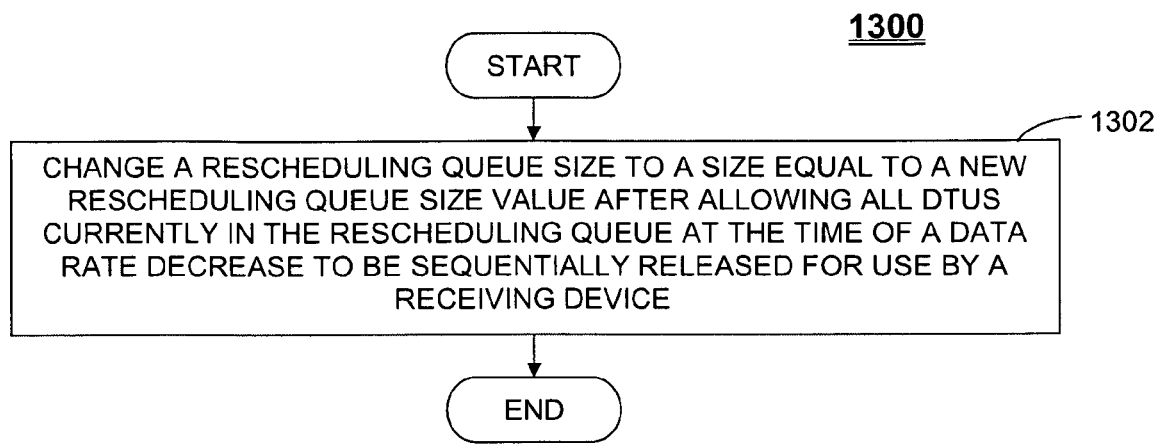
FIG. 13 is a flowchart depicting a method for changing a size of a rescheduling queue due to a decrease in data rate, according to an embodiment of the present invention.

FIG. 13 is a flowchart depicting a method 1300 for changing a size of a rescheduling queue due to a decrease in data rate, according to an embodiment of the present invention. In method 1300, the size of the rescheduling queue is changed based on a new rescheduling queue size value that has been previously determined, e.g., using method 800. In step 1302, all DTUs currently in a rescheduling queue at the time of a data rate decrease are allowed to be sequentially released for use by a receiving device. After this happens, the rescheduling queue size is changed to a size equal to the new rescheduling queue size value. In an embodiment, the received placeholder DTUs can be the placeholder DTUs that were generated and transmitted in method 1100.

Further Embodiments, Features, and Advantages

Systems and methods for seamlessly modifying retransmission and rescheduling queues for a retransmission scheme of a communications system are provided herein. More specifically, systems and methods are provided for dynamically changing the sizes of the retransmission queue and the rescheduling queue during an online reconfiguration due to, for example, a data rate change. The systems and methods provided herein provide for changes in data rate while maintaining impulse noise protection, ensuring that the retransmission queue spans a duration greater than a round trip delay, and maintaining a constraint on the overall maximum delay of the data. Applying embodiments of this invention to communication systems maintains the integrity of the system and continues to prevent data loss during changes to the data rate.

The mechanism described above supports seamless rate adaptation of a communication system together with retransmission on a much wider range than what is possible without the invention. If the invention is not used, the range of rate variation will be limited by the maximum delay, the impulse noise protection, and/or the roundtrip delay. Embodiments of the invention can be applied to any retransmission scheme where transmitted units are concatenated in a continuous byte stream without idle bytes (over the line, "U"), where the rate of the byte stream may change.

As will be appreciated by persons skilled in the relevant art(s), the system(s) and method(s) described here represent only a few possible embodiments of the present invention. Many of the elements described herein could, in alternative embodiments of the present invention, be configured differently within the scope and spirit of the present invention. In addition, additional elements, or a different organization of the various elements, could still implement the overall effect and intent of the present systems and method. Therefore, the scope of the present invention is not limited by the above disclosure and detailed embodiments described therein, but rather is determined by the scope of the appended claims.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, in a transmitting device, for transmitting data transmission units (DTUs) of a fixed size to a receiving device comprising:
   receiving, from the receiving device, a request to change a data rate between the transmitting and receiving devices; and
   for an increase in the data rate, determining a new retransmission queue size value for a retransmission queue at the transmitting device and a new rescheduling queue size value for a rescheduling queue at the receiving device such that an amount of time for a DTU to enter and exit the retransmission queue is greater than a roundtrip delay, wherein the roundtrip delay is an amount of time between when the DTU enters the retransmission queue and when an acknowledgement is received from the receiving device regarding transmission of a corresponding copy of the DTU.

2. The method of claim 1, further comprising changing a size of the retransmission queue, wherein the changing the size of the retransmission queue, upon an increase in data rate, includes:
   adding a determined number of placeholder DTU spaces at the end of the retransmission queue, wherein the determined number is equal to a change in the retransmission queue size value divided by the fixed size of a DTU, wherein the change in the retransmission queue size value is equal to the new retransmission queue size value minus a current retransmission queue size value; and
   transmitting new DTUs in an amount equal to the determined number while pushing a copy of each of the new DTUs into the retransmission queue such that the placeholder DTU spaces are pushed out of the retransmission queue.

3. The method of claim 2, further comprising:
   increasing timestamps of each DTU in the retransmission queue by a difference between the new rescheduling queue size value and a current rescheduling queue size value.

4. The method of claim 1, further comprising changing a size of the rescheduling queue, wherein the changing the size of the rescheduling queue, upon an increase in data rate, includes:
   adding a determined number of DTU placeholder spaces to the rescheduling queue while postponing DTU release from the rescheduling queue for an amount of time that it would take to release DTUs in an amount equal to the determined number, wherein the determined number is equal to the new rescheduling queue size value minus a current rescheduling queue size value, wherein units of queue size are DTUs.

5. The method of claim 4, further comprising:
   increasing timestamps of each DTU in the rescheduling queue by a difference between the new rescheduling queue size value and the current rescheduling queue size value.

6. The method of claim 1, further comprising:
   for a decrease in data rate, determining the new retransmission queue size value and the new rescheduling queue size value such that an amount of time for the DTU to enter and exit the retransmission queue is less than a maximum delay, wherein the maximum delay is an amount of time between when the DTU enters the retransmission queue and when a corresponding copy of the DTU exits the rescheduling queue.

7. The method of claim 6, further comprising:
   communicating the new retransmission queue size value and the new rescheduling queue size value between the receiving device and the transmitting device.

8. The method of claim 6, wherein the determining steps occur at the transmitting device.

9. The method of claim 6, wherein the determining steps occur at the receiving device.

10. The method of claim 6, further comprising changing a size of the retransmission queue, wherein the changing the size of the retransmission queue, upon a decrease in data rate, includes:
   when retransmission of a DTU is not needed, performing a placeholder generation process including
     generating a placeholder DTU that is a valid DTU;
     transmitting the placeholder DTU;
     pushing a copy of the placeholder DTU into the retransmission queue; and
     decreasing a current rescheduling queue size value, as seen by the transmitting device, by one DTU;
   checking a DTU at the end of the retransmission queue such that one of the following is performed:
     if the checked DTU is not a placeholder DTU, acknowledgement of receipt was received from the receiving device, and the current rescheduling queue size value does not equal the new rescheduling queue size value as seen by the transmitting device, the generating, transmitting, pushing, and decreasing steps of the placeholder generation process are performed;
     if the checked DTU is not a placeholder DTU, acknowledgement of receipt was received from the receiving device, and the current rescheduling queue size value equals the new rescheduling queue size value as seen by the transmitting device, a new DTU is transmitted and a copy of the new DTU is pushed into the retransmission queue;
     if the checked DTU is not a placeholder DTU and acknowledgement of receipt has not been received from the receiving device, the checked DTU is retransmitted and a copy of the retransmitted DTU is pushed into the retransmission queue;
     if the checked DTU is a placeholder DTU and a current retransmission queue size value does not equal the new retransmission queue size value, the current retransmission queue size value is decreased by one DTU and the placeholder DTU is discarded;
     if the checked DTU is a placeholder DTU, the current retransmission queue size value equals the new retransmission queue size value, and the current rescheduling queue size value does not equal the new rescheduling queue size value as seen by the transmitting device, the generating, transmitting, pushing, and decreasing steps of the placeholder generation process are performed; and if the checked DTU is a placeholder DTU, the current retransmission queue size value equals the new retransmission queue size value, and the current rescheduling queue size value equals the new rescheduling queue size value as seen by the transmitting device, a new DTU is transmitted and a copy of the new DTU is pushed into the retransmission queue; and repeating the checking of a DTU at the end of the retransmission queue until the current retransmission queue size value equals the new retransmission queue size value and the current rescheduling queue size value equals the new rescheduling queue size value.

11. The method of claim 10, wherein the generating a placeholder DTU includes generating the placeholder DTU as one of a last transmitted DTU and a previously transmitted DTU having the highest DTU sequence.

12. The method of claim 10, wherein the generating a placeholder DTU includes indicating the placeholder DTU as a placeholder DTU by including a flag in a retransmission container of the placeholder DTU.

13. The method of claim 6, further comprising changing a size of the rescheduling queue, wherein the changing the size of the rescheduling queue, upon a decrease in data rate, comprises:

changing the rescheduling queue size to a size equal to the new rescheduling queue size value after allowing all DTUs currently in the rescheduling queue at the time of the data rate decrease to be sequentially released for use by the receiving device.

14. A method, in a transmitting device, for changing queue size values to support retransmission to a receiving device in a communications system, the method comprising:

communicating, from the receiving device to the transmitting device, a request to change a data rate for transmission of data transmission units (DTUs) of a fixed size; and for a decrease in data rate, determining a new retransmission queue size value for a retransmission queue at the transmitting device and a new rescheduling queue size value for a rescheduling queue at the receiving device such that an amount of time for a DTU to enter and exit the retransmission queue is less than a maximum delay, wherein the maximum delay is an amount of time between when the DTU enters the retransmission queue and when a corresponding copy of the DTU exits the rescheduling queue.

15. A system for changing queue size values to support retransmission from a transmitting device to a receiving device in a communications system, the system comprising:

a retransmission queue at a transmitting device, the retransmission queue having a size equal to a current retransmission queue size value;

a rescheduling queue at a receiving device, the rescheduling queue having a size equal to a current rescheduling queue size value; and a queue size determination processor configured to, upon a request to change a data rate for data transmission unit (DTU) transmission received from a receiving device, determine queue size value changes for the retransmission queue and the rescheduling queue, such that delay variation is minimized without loss of impulse noise protection.

16. The system of claim 15, wherein the queue size determination processor is located at the transmitting device.

17. The system of claim 15, wherein the queue size determination processor is located at the receiving device.

18. The system of claim 15, wherein the queue size determination processor is configured to, for an increase in data rate, determine a new retransmission queue size value and a new rescheduling queue size value such that an amount of time for a DTU to enter and exit the retransmission queue is greater than a roundtrip delay, wherein the roundtrip delay is an amount of time between when the DTU enters the retransmission queue and when an acknowledgement is received from the receiving device regarding transmission of a corresponding copy of the DTU.

19. The system of claim 18, further comprising a retransmission processor located at the transmitting device and configured to control the retransmission queue.

20. The system of claim 19, wherein the queue size determination processor is the retransmission. processor.

21. The system of claim 19, wherein the retransmission processor is configured to change the size of the retransmission queue by:

adding a determined number of placeholder DTU spaces at the end of the retransmission queue, wherein the determined number is equal to a change in the retransmission queue size value divided by a fixed size of a DTU, wherein the change in the retransmission queue size value is equal to the new retransmission queue size value minus the current retransmission queue size value, wherein units of queue size are DTUs; and transmitting new DTUs in an amount equal to the determined number while pushing a copy of each of the new DTUs into the retransmission queue such that the placeholder DTU spaces are pushed out of the retransmission queue.

22. The system of claim 18, further comprising a rescheduling processor located at the receiving device and configured to control the rescheduling queue.

23. The system of claim 22, wherein the queue size determination processor is the rescheduling processor.

24. The system of claim 22, wherein the rescheduling processor is configured to change the size of the rescheduling queue by:

adding a determined number of DTU placeholder spaces to the rescheduling queue while postponing DTU release from the rescheduling queue for an amount of time that it would take to release DTUs in an amount equal to the determined number, wherein the determined number is equal to the new rescheduling queue size value minus the current rescheduling queue size value, wherein units of queue size are DTUs.

25. The system of claim 15, wherein the queue size determination processor is configured to, for a decrease in data rate, determine a new retransmission queue size value and a new rescheduling queue size value such that an amount of time for a DTU to enter and exit the retransmission queue is less than a maximum delay, wherein the maximum delay is an amount of time between when the DTU enters the retransmission queue and when a corresponding copy of the DTU exits the rescheduling queue.

26. The system of claim 25, further comprising a retransmission processor located at the transmitting device and configured to control the retransmission queue.

27. The system of claim 26, wherein the queue size determination processor is the retransmission processor.

28. The system of claim 26, wherein the retransmission processor is configured to change the size of the retransmission queue by:
- when retransmission of a DTU is not needed, performing a placeholder generation process including
  - generating a placeholder DTU that is a valid DTU;
  - transmitting the placeholder DTU;
  - pushing a copy of the placeholder DTU into the retransmission queue; and
  - decreasing the current rescheduling queue size value, as seen by the transmitting device, by one DTU;
- checking a DTU at the end of the retransmission queue such that one of the following is performed:
  - if the checked DTU is not a placeholder DTU, acknowledgement of receipt was received from the receiving device, and the current rescheduling queue size value does not equal the new rescheduling queue size value as seen by the transmitting device, the generating, transmitting, pushing, and decreasing steps of the placeholder generation process are performed;
  - if the checked DTU is not a placeholder DTU, acknowledgement of receipt was received from the receiving device, and the current rescheduling queue size value equals the new rescheduling queue size value as seen by the transmitting device, a new DTU is transmitted and a copy of the new DTU is pushed into the retransmission queue;
  - if the checked DTU is not a placeholder DTU and acknowledgement of receipt has not been received from the receiving device, the checked DTU is retransmitted and a copy of the retransmitted DTU is pushed into the retransmission queue;
  - if the checked DTU is a placeholder DTU and a current retransmission queue size value does not equal the new retransmission queue size value, the current retransmission queue size value is decreased by one DTU and the placeholder DTU is discarded;
  - if the checked DTU is a placeholder DTU the current retransmission queue size value equals the new retransmission queue size value, and the current rescheduling queue size value does not equal the new rescheduling queue size value as seen by the transmitting device, the generating, transmitting, pushing, and decreasing steps of the placeholder generation process are performed; and
  - if the checked DTU is a placeholder DTU, the current retransmission queue size value equals the new retransmission queue size value, and the current rescheduling queue size value equals the new rescheduling queue size value as seen by the transmitting device, a new DTU is transmitted and a copy of the new DTU is pushed into the retransmission queue; and
- repeating the checking of a DTU at the end of the retransmission queue until the current retransmission queue size value equals the new retransmission queue size value and the current rescheduling queue size value equals the new rescheduling queue size value.

29. The system of claim 28, wherein the valid DTU is one of a last transmitted DTU and a previously transmitted DTU having the highest DTU sequence.

30. The system of claim 28, wherein the placeholder DTU is indicated as a placeholder DTU by a flag in a retransmission container of the placeholder DTU.

31. The system of claim 25, further comprising a rescheduling processor located at the receiving device and configured to control the rescheduling queue.

32. The system of claim 31, wherein the queue size determination processor is the rescheduling processor.

33. The system of claim 31, wherein the rescheduling processor is configured to change the size of the rescheduling queue by:
- changing the rescheduling queue size to a size equal to the new rescheduling queue size value after allowing all DTUs currently in the rescheduling queue at the time of the data rate decrease to he sequentially released.

* * * * *

UNITED STATES PATENT AND TRADEMARK OFFICE
CERTIFICATE OF CORRECTION

PATENT NO.         : 8,381,057 B2
APPLICATION NO.    : 12/385546
DATED              : February 19, 2013
INVENTOR(S)        : Miguel Peeters Page 1 of 1

It is certified that error appears in the above-identified patent and that said Letters Patent is hereby corrected as shown below:

In the Claims:

In column 18, line 20, please replace "retransmission. processor" with --retransmission processor--;

In column 19, line 38, please replace "placeholder DTU" with --placeholder DTU,--; and In column 20, line 37, please replace "he" with --be--.

Signed and Sealed this
Twenty-third Day of April, 2013

Teresa Stanek Rea
*Acting Director of the United States Patent and Trademark Office*